United States Patent
Goto et al.

(10) Patent No.: US 8,838,044 B2
(45) Date of Patent: Sep. 16, 2014

(54) ATTENUATING ANTENNA SWITCH AND COMMUNICATION DEVICE

(75) Inventors: Satoshi Goto, Kawasaki (JP); Kazuaki Hori, Kawasaki (JP); Satoshi Sakurai, Kawasaki (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 198 days.

(21) Appl. No.: 13/610,237

(22) Filed: Sep. 11, 2012

(65) Prior Publication Data

US 2013/0072134 A1 Mar. 21, 2013

(30) Foreign Application Priority Data

Sep. 16, 2011 (JP) .................. 2011-203480

(51) Int. Cl.
*H04B 1/44* (2006.01)
*H04B 1/10* (2006.01)

(52) U.S. Cl.
CPC *H04B 1/109* (2013.01); *Y02B 60/50* (2013.01)
USPC ............ 455/78; 455/73; 455/82; 455/83; 455/91

(58) Field of Classification Search
CPC .................. H04B 1/04; H04B 1/525
USPC .......... 455/73, 78, 82, 83, 550.1, 91
See application file for complete search history.

(56) References Cited

U.S. PATENT DOCUMENTS

| 5,862,461 A | 1/1999 | Yoshizawa et al. |
| 7,864,491 B1 * | 1/2011 | Bauder et al. .................. 361/13 |
| 2003/0174254 A1 * | 9/2003 | Osada et al. .................. 348/731 |
| 2006/0245382 A1 * | 11/2006 | Hayashi ....................... 370/297 |
| 2010/0188163 A1 | 7/2010 | Goto et al. |

FOREIGN PATENT DOCUMENTS

JP H06-252794 A 9/1994

* cited by examiner

*Primary Examiner* — Tuan Pham
(74) *Attorney, Agent, or Firm* — Womble Carlyle

(57) ABSTRACT

An attenuating antenna switch may be used to suppress increase in the scale and power consumption of an RFIC. The antenna switch has a first terminal, a second terminal, and an antenna terminal coupled to the first and second terminals and configured to be connected to an antenna. The first switch switches between a first state in which a high frequency signal is propagated between the first terminal and the antenna terminal, and a second state in which the high frequency signal is interrupted. A second switch switches between the first and second states between the second terminal and the antenna terminal. The first and second switches are controlled in a mutually exclusive manner such that only one of the two switches can be in the first state at any given time. When in the first state, each switch adjusts an attenuation amount of the high frequency signal.

20 Claims, 16 Drawing Sheets

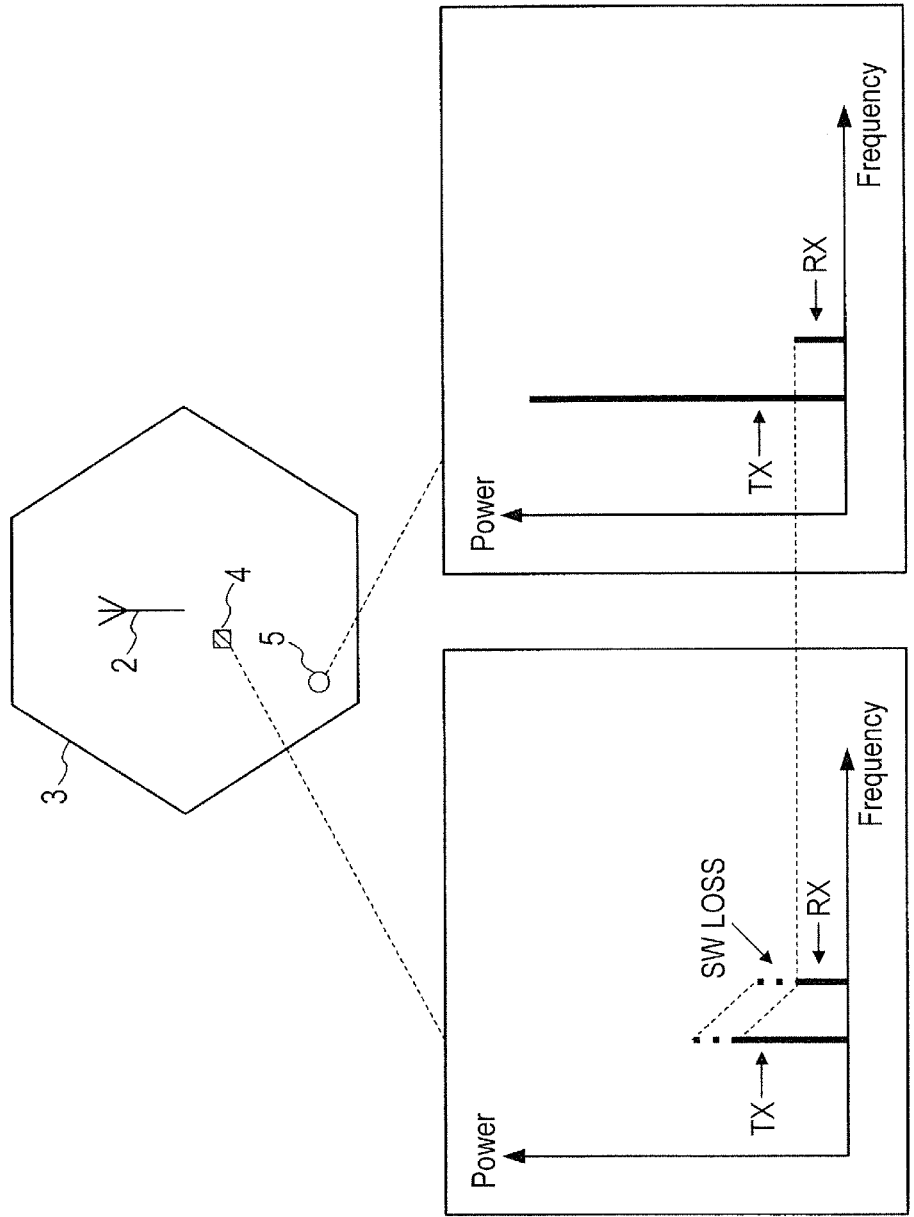

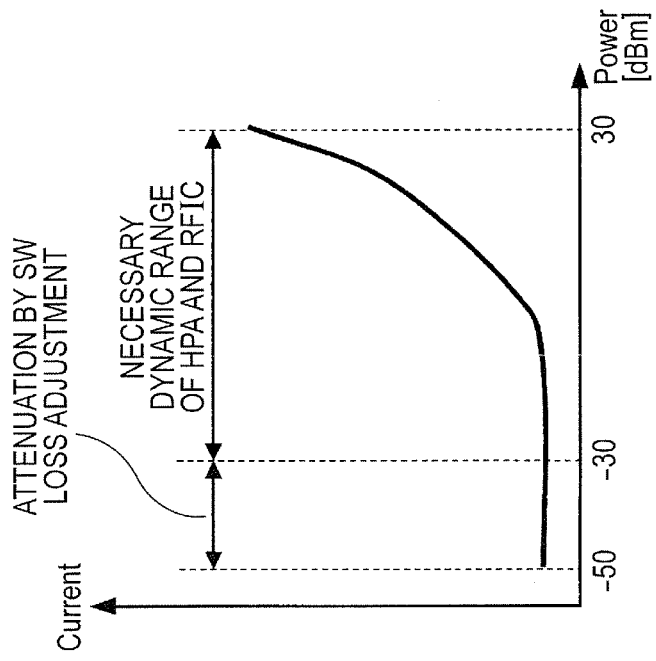
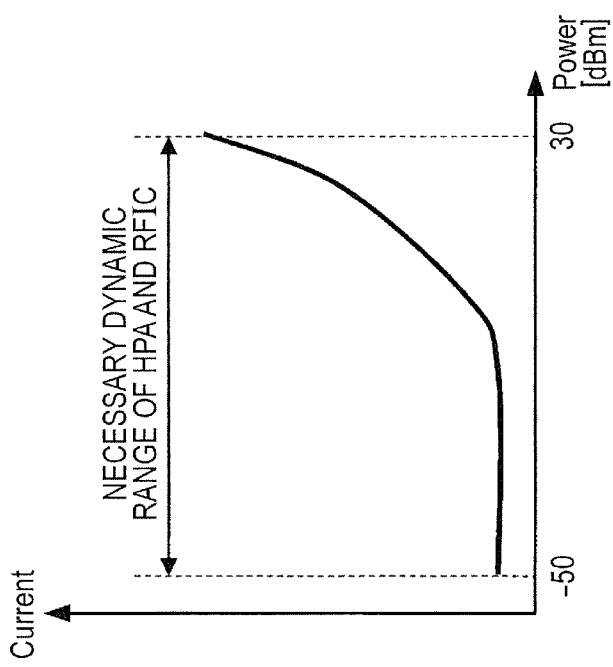

ATTENUATING ANTENNA SWITCH AND COMMUNICATION DEVICE

CROSS-REFERENCE TO RELATED APPLICATIONS

The disclosure of Japanese Patent Application No. 2011-203480 filed on Sep. 16, 2011 including the specification, drawings and abstract is incorporated herein by reference in its entirety.

BACKGROUND

The present invention relates to an antenna switch and a communication device and, more particularly, to a technique of adjusting power of a high frequency signal by means of an attenuating antenna switch configured to attenuate a signal in a controlled manner.

A communication device such as a cellular phone performs stationary communication with a base station as a relay device at the time of radio communication between communication devices. A communicatable range of one base station is called a cell. In one cell, a communication device adjusts transmission power of a high frequency signal and reception sensitivity in accordance with distance to the base station.

Generally, the transmission power has to be adjusted in the range of about −50 dBm to 30 dBm in accordance with the distance to the base station. The adjustment of the transmission power is performed by varying the gain of an RFIC (Radio Frequency Integrated Circuit) or an HPA (High Power Amplifier) mounted on a communication device.

On the other hand, at the time of adjusting the reception sensitivity, the gain of an LNA (Low Noise Amplifier) in an RFIC is varied so that reception power of a high frequency signal from a base station becomes a level at which the signal can be demodulated.

Patent literature 1 discloses a communication device in which a plurality of amplifiers having different gains are provided in parallel and an amplifier used for amplifying a high frequency signal is alternatively selected in accordance with transmission power or reception power to be satisfied. Patent literature 2 discloses an antenna switch for switching between transmission and reception of a high frequency signal in a time division manner.

RELATED ART LITERATURE

Patent Literature

Patent Literature 1
Japanese Unexamined Patent Publication No. Hei 9 (1997) 130275
Patent Literature 2
Japanese Unexamined Patent Publication No. 2010-178026
Patent Literature 3
Japanese Unexamined Patent Publication No. Hei 6 (1994) 252794

The inventors of the present invention found out that the communication device has a problem in that the scale and power consumption of an RFIC is large.

Concretely, at the time of adjusting transmission power, the transmission power cannot be sufficiently decreased by the gain adjustment of the HPA. Consequently, in the case of decreasing the transmission power to 0 dBm or less, the gain adjustment by the RFIC is mainly performed. Therefore, a wide dynamic range of about 60 dB to 70 dB is requested for the RFIC, and it causes increase in the scale and power consumption of the RFIC. For example, the RFIC has to be provided with an isolation circuit for suppressing local leak, a control mechanism for it, and the like.

On the other hand, at the time of adjusting reception sensitivity, since the reception power varies according to the distance to the base station, a predetermined dynamic range is requested for the gain of an LNA and it causes increase in the scale and power consumption of the RFIC. For example, it is necessary to provide amplifiers in multiple stages and perform control individually on each of the amplifiers.

As a reference technique, patent literature 3 discloses a communication device in which when reception power is too high, a reception terminal of an antenna switch is opened to attenuate a reception signal. In the communication device, however, the dynamic range necessary for the RFIC cannot be sufficiently narrowed. Actually, amplifiers in many stages are provided at the post stage of the antenna switch.

SUMMARY

An antenna switch as an embodiment of the present invention includes first and second switches exclusively switching a state of propagating a high frequency signal and a state of interrupting a high frequency signal between an antenna and a post-stage circuit. At the time of propagating a high frequency signal, each of the switches adjusts an attenuation amount of the high frequency signal to any of a plurality of stages.

That is, in the present invention, by varying the passage loss of the antenna switch, the high frequency signal is attenuated. Consequently, the dynamic range necessary for the RFIC can be narrowed.

According to the present invention, increase in the scale and power consumption of the RFIC can be suppressed.

BRIEF DESCRIPTION OF THE DRAWINGS

FIG. 5 is a diagram for explaining usefulness of the antenna switch according to the first embodiment of the invention.

FIGS. 6A and 6B are graphs for explaining effectiveness of the antenna switch according to the first embodiment of the invention.

DETAILED DESCRIPTION

Figure 1:
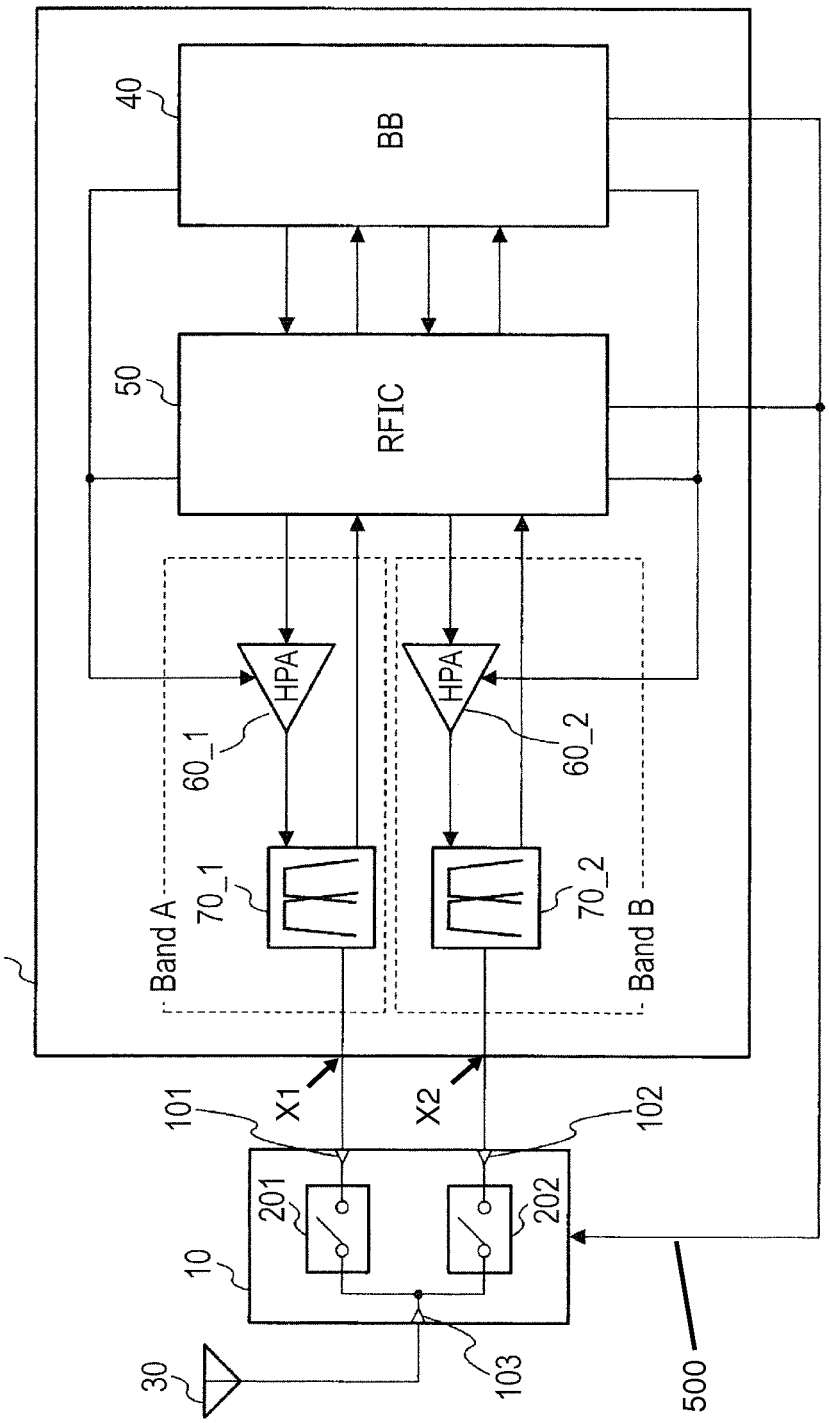
FIG. 1 is a block diagram showing a configuration example of a communication device, such as cellular phone, to which an antenna switch according to a first embodiment of the present invention is applied.

Hereinafter, first to fifth embodiments of an antenna switch according to the present invention and a communication device to which the antenna switch is applied will be described with reference to FIGS. 1 to 16. In the drawings, the same reference numeral is designated to the same component. For clear description, the description will not be repeated as necessary.

First Embodiment

As shown in FIG. 1, a communication device 1A of a first embodiment employs, as a communication system, the FDD (Frequency Division Duplex) method such as WCDMA (Wideband Code Division Multiple Access). The communication device 1A has an attenuating antenna switch 10 ("antenna switch") according to the embodiment and a transmission/reception circuit 20.

The antenna switch 10 includes two (respective first and second) signal terminals 101 and 102, an antenna terminal 103 for coupling an antenna 30, and two (respective first and second) switches 201 and 202.

The switch 201 switches between a first state where a high frequency signal is propagated between the signal terminal 101 and the antenna terminal 103 (hereinbelow, called a propagation state) and a second state where the high frequency signal is interrupted (hereinbelow, called an interruption state). The switch 202 similarly switches between the propagation state and the interruption state between the signal terminal 102 and the antenna terminal 103. Switches 201 and 202 are controlled in a mutually exclusive manner such that only one of the two switches can be in the first state (propagation state) at any given time. When in the propagation state, each of the switches 201 and 202 adjusts an attenuation amount of the high frequency signal to any of a plurality of stages as will be described later under control of the transmission/reception circuit 20. In the following description, the adjustment will be also called SW loss adjustment.

On the other hand, the transmission/reception circuit 20 includes a BB (baseband) circuit 40, an RFIC 50, two high power amplifiers (HPAs) 60_1 and 60_2, and two duplexers 70_1 and 70_2. The transmission/reception circuit 20 includes first and second circuit terminals X1, X2, respectively, which connect to corresponding first and second signal terminals 101, 102 of antenna switch 10.

The BB circuit 40 generates a desired baseband signal, outputs it to the RFIC 50, and processes a baseband signal supplied from the RFIC 50.

The RFIC 50 performs processes such as modulation and frequency conversion on the baseband signal supplied from the BB circuit 40 and outputs a high frequency signal obtained by the processes to the HPA 60_1 or 60_2.

Concretely, the RFIC 50 outputs the high frequency signal to the first HPA 60_1 in a system environment using a frequency band "A". In this case, the RFIC 50 or the BB circuit 40 controls the antenna switch 10 in advance through one or more control signals 500, which may be in the form of control voltages, switches the first switch 201 to the propagation state, and switches the second switch 202 to the interruption state.

On the other hand, in a system environment using a frequency band "B", the RFIC 50 outputs a high frequency signal to the second HPA 60_2. In this case, the RFIC 50 or the BB circuit 40 controls the antenna switch 10 in advance through one or more control signals 500, which may be in the form of control voltages, switches the second switch 202 to the propagation state, and switches the first switch 201 to the interruption state.

Consequently, the high frequency signal is transmitted from the antenna 30 via the duplexer 70_1 or 70_2 and the corresponding switch 201 or 202. The RFIC 50 or the BB circuit 40 performs, in addition to the control related to the SW loss adjustment by the antenna switch 10, a control of varying the gain of the HPA 60_1 or 60_2.

In the system environment using the frequency band "A", the RFIC 50 receives the high frequency signal via the antenna 30, the first switch 201, and the first duplexer 70_1. On the other hand, in the system environment using the frequency band "B", the RFIC 50 receives the high frequency signal via the antenna 30, the second switch 202, and the second duplexer 70_2. The RFIC 50 performs processes such as demodulation and frequency conversion on the received high frequency signal and outputs a baseband signal obtained by the processes to the BB circuit 40.

In transmitting operation, in the case where transmission power of the high frequency signal has to be decreased to a predetermined level (for example, −30 dBm) or less, the RFIC 50 or the BB circuit 40, through one or more control signals 500, makes the antenna switch 10 perform the SW loss adjustment to attenuate the high frequency signal to a desired level. Generally, the value of the transmission power to be satisfied is instructed from a base station.

In such a manner, the lower limit value of the output level from the RFIC 50 can be set to a predetermined value higher than the lower limit value of transmission power to be satisfied. Therefore, the dynamic range necessary for the RFIC 50 at the time of transmission of a high frequency signal can be narrowed.

On the other hand, in the receiving operation, the RFIC 50 or the BB circuit 40, through one or more control signals 500, makes the antenna switch 10 perform the SW loss adjustment in accordance with RSSI (Received Signal Strength Indicator, which is a measurement of the strength of an incoming signal) or the like measured by the RFIC 50 to maintain the power of the high frequency signal which is input to the RFIC 50 at predetermined level.

It makes, in the RFIC 50, gain adjustment by an LNA (not shown) unnecessary or insignificant. Therefore, the dynamic range necessary for the RFIC 50 at the time of reception of a high frequency signal can be narrowed.

The antenna switch 10 can be applied not only to a communication device employing the FDD method but also to a communication device employing the TDD (Time Division Duplex) method such as GSM (Global System for Mobile Communications).

Figure 2:
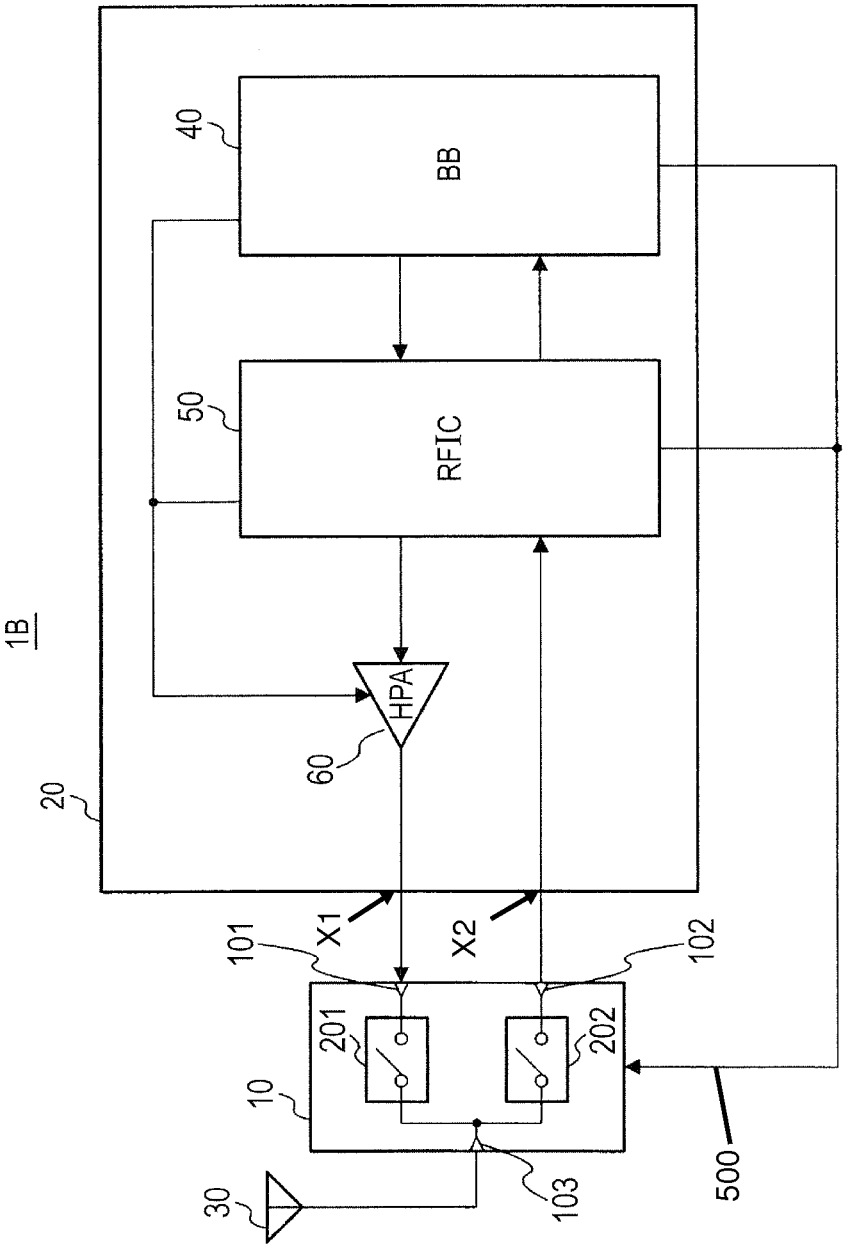
FIG. 2 is a block diagram showing another configuration example of a communication device, such a cellular phone, to which the antenna switch according to the first embodiment of the invention is applied.

In the case of employing the TDD method, a communication device is configured as shown in FIG. 2. A communication device 1B shown in FIG. 2 is different from the communication device 1A shown in FIG. 1 with respect to the point that the transmission/reception circuit 20 includes the BB circuit 40, the RFIC 50, and only one HPA 60. A high frequency signal output from the RFIC 50 is supplied to the first signal terminal 101 of the antenna switch 10 via the HPA 60 and first circuit terminal X1 of the transmission/reception circuit 20. On the other hand, the high frequency signal received via the antenna 30 is supplied to the RFIC 50 via the second signal terminal 102 of the antenna switch 10 and the second circuit terminal X2 of the transmission/reception circuit 20.

In the transmission period, the RFIC 50 or the BB circuit 40, through one or more control signals 500, switches the first switch 201 in the antenna switch 10 to the propagation state and switches the second switch 202 to the interruption state. On the other hand, in the reception period, the RFIC 50 or the BB circuit 40, through one or more control signals 500, switches the second switch 202 to the propagation state and switches the first switch 201 to the interruption state. In such a manner, a transmission signal and a reception signal are supplied in a time division manner to the SW loss adjustment in the antenna switch 10.

A concrete configuration example and a concrete operation example of the antenna switch 10 realizing the above-described operation will now be described in detail with reference to FIGS. 3 and 4.

Figure 3:
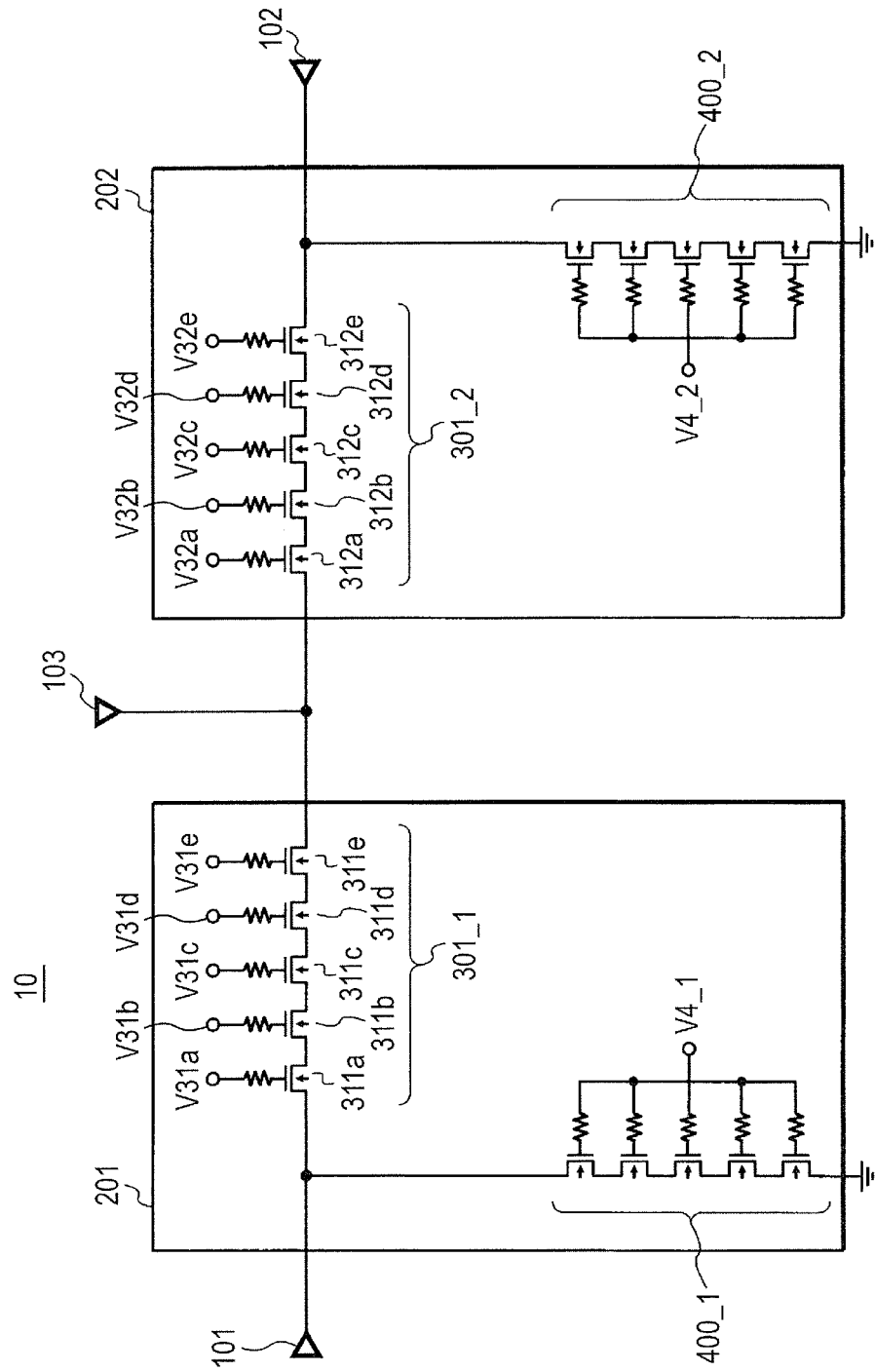
FIG. 3 is a block diagram showing a configuration example of the antenna switch according to the first embodiment of the invention.

As illustrated in FIG. 3, the first switch 201 in the antenna switch 10 includes a first FET series block 301_1 and a first FET shunt block 400_1.

The first FET series block 301_1 is made by, for example, five FETs (Field Effect Transistors) 311a to 311e whose source and drain paths are coupled in series between the signal terminal 101 and the antenna terminal 103. To the FETs 311a to 311e, individual first series control voltages V31a to V31e are applied from the RFIC 50 or the BB circuit 40 via gate resistors.

On the other hand, the first FET shunt block 400_1 is made by a plurality of FETs whose source and drain paths are coupled in series between the ground point and a connection point (first node) between the signal terminal 101 and the first FET series block 301_1. To the FETs in the first FET shunt block 400_1, a common first shunt control voltage V4_1 is applied from the RFIC 50 or the BB circuit 40 via gate resistors.

Similarly, the second switch 202 in the antenna switch 10 includes a second FET series block 301_2 and a second FET shunt block 400_2.

The second FET series block 301_2 is made by, for example, five FETs 312a to 312e whose source and drain paths are coupled in series between the signal terminal 102 and the antenna terminal 103. To the FETs 312a to 312e, individual second series control voltages V32a to V32e are applied from the RFIC 50 or the BB circuit 40 via gate resistors.

On the other hand, the second FET shunt block 400_2 is made by a plurality of FETs whose source and drain paths are coupled in series between the ground point and a connection point (second node) between the signal terminal 102 and the second FET series block 301_2. To the FETs in the second FET shunt block 400_2, a common second shunt control voltage V4_2 is applied from the RFIC 50 or the BB circuit 40 via gate resistors.

The number of FETs stacked in each of the series blocks and the shunt blocks may be properly determined according to maximum power applied to the terminals.

The antenna switch 10 therefore is capable of providing two mutually exclusive attenuating signal paths therethrough. Next, operation related to the SW loss adjustment will be described using a case, as an example, where the first switch 201 is set to the propagation state and the second switch 202 is set to the interruption state as shown in FIG. 4.

The RFIC 50 or the BB circuit 40 turns off a first number of FETs in the first FET series block 301_1. On the other hand, the RFIC 50 or the BB circuit 40 turns on the remaining number (i.e., the rest) of the FETs in the first FET series block 301_1 by applying a control voltage equal to or higher than the threshold voltage of those FETs. In the example of FIG. 4 showing a total of a number N=5 FETs, a first number of three FETs 311a to 311c are turned off and the remaining number (of two) FETs 311d and 311e are turned on. Although not illustrated, the FETs in the first FET shunt block 400_1 and the FETs 312a to 312e in the second series block 301_2 are off.

The source-drain paths of the FETs in the on state can be regarded as resistive elements. The source and the drain in each of the FETs in the off state are coupled via a capacitor and can be regarded as capacitive elements. Consequently, in the first FET series block 301_1 in which some FETs are off and the other FETs are on, the capacitive elements are coupled in series to the resistive elements, so that a passage loss is larger than that in the case where all of the FETs are on.

Therefore, the high frequency signal can be attenuated between the first signal terminal 101 and the antenna terminal 103. The attenuation amount can be adjusted in steps by changing the number of the FETs which are turned off.

The variable range and the varying step of the attenuation amount can be properly adjusted by changing a characteristic of the FET (for example, by changing the size such as gate width) included in the series block 301_1. In the example of FIG. 4, by applying the individual first series control voltages V31a to V31e, the FETs in the first FET series block 301_1 are partially turned off. The partial turn-off operation can be also realized, for example, by configuring the first FET series block 301_1 by using FETs having different characteristics and applying common control voltage to the FETs.

The RFIC 50 or the BB circuit 40 turns on the FETs in the second FET shunt block 400_2 by applying a common second shunt control voltage V4_2 equal to or higher than the threshold voltage. By the operation, even if a high frequency signal passes through the second series block 301_2 in the direction of second terminal 102, the high frequency signal is transmitted ("shunted") toward a ground point via second shunt FET block 400_2. Consequently, leakage of the high frequency signal to the other signal terminal 102 can be suppressed.

The usefulness and effectiveness of the antenna switch 10 will be described in order with reference to FIGS. 5 to 8.

First, the usefulness of the antenna switch 10 will be described using the case, as an example, where the communication device 1A (refer to FIG. 1) employing the FDD method performs communication in a cell 3 formed by a base station 2.

As a precondition, it is desirable to lower the transmission power of the communication device toward the base station. Since the reception power increases toward the base station, it is desirable to lower reception sensitivity of the communication device. On the other hand, it is desirable to increase the transmission power of the communication device with distance from the base station. Since the reception power decreases with distance from the base station, it is desirable to make the reception sensitivity of the communication device high. In other words, the nearer the base station, the more attenuation is necessary for the transmission power and reception power. With distance from the base station, the less attenuation is needed.

In the case where the communication device 1A is positioned in a point 4 close to the base station 2, the communication device 1A determines that the transmission power has to be decreased to a predetermined level or lower, and makes the antenna switch 10 perform the SW loss adjustment. At this time, the antenna switch 10 attenuates transmission power TX and reception power RX simultaneously.

As described above, the communication device 1A makes the antenna switch 10 perform the SW loss adjustment in accordance with the reception power to maintain the reception power at a predetermined level. In the case where the communication device 1A is positioned in a point 5 far from the base station 2, the reception power is low. Accordingly, the attenuation amount of the transmission power TX and the reception power RX is small.

Therefore, the antenna switch 10 satisfies the precondition and is suitable to be used in the FDD method. As described above, in the TDD method, a transmission signal and a reception signal are provided for the SW loss adjustment in a time division manner. The antenna switch 10 alternatively attenuates the transmission power or the reception power. Obviously, the antenna switch 10 is also suited to be used in the TDD method.

Next, the effectiveness of the antenna switch 10 will be described in detail with reference to FIGS. 6 to 8.

As shown in FIG. 6A, the transmission power of the high frequency signal has to be adjusted in a wide range of about −50 dBm to 30 dBm. Consequently, in a general communication device, the dynamic range necessary for the HPA and the RFIC is as wide as 80 dB. As described above, the transmission power cannot be sufficiently decreased by the gain adjustment made by the HPA. In the case of decreasing the transmission power to 0 dBm or less, therefore, the gain adjustment by the RFIC is mainly performed, and a wide dynamic range of about 60 to 70 dB is requested for the RFIC.

On the other hand, in the embodiment, as shown in FIG. 6B, by the SW loss adjustment in the antenna switch 10, the dynamic range necessary for the HPA and the RFIC is largely narrowed. Therefore, design of the RFIC is facilitated, and the circuit scale can be reduced.

Figure 7:
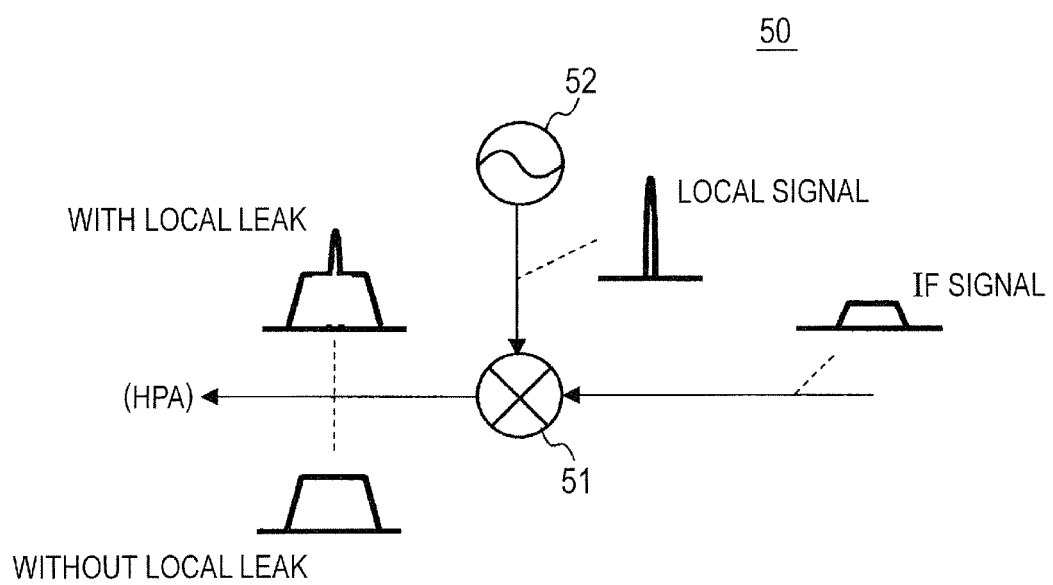
FIG. 7 is a block diagram for explaining effectiveness of the antenna switch according to the first embodiment of the invention.

If the transmission power is decreased to a predetermined level or less by the RFIC 50, as shown in FIG. 7, the level of an IF (Intermediate Frequency) signal which is supplied to a mixer 51 in the RFIC 50 has to be lowered, and there is the possibility that local leak occurs. Concretely, the mixer 51 in the RFIC 50 mixes an IF signal and a local signal output from a synthesizer 52 to generate a high frequency signal. The lower the level of the IF signal is, the more the local leak occurs, and isolation from the local signal is required. It is consequently necessary to provide the RFIC 50 with an isolation signal or the like so that the scale and the power consumption of the RFIC 50 increases.

In the embodiment, however, decrease in the transmission power to the predetermined level or less is realized by the SW loss adjustment in the antenna switch 10. Consequently, it is unnecessary to provide the RFIC 50 with excessive isolation, so that the scale and power consumption of the RFIC 50 can be reduced.

Figure 8A:
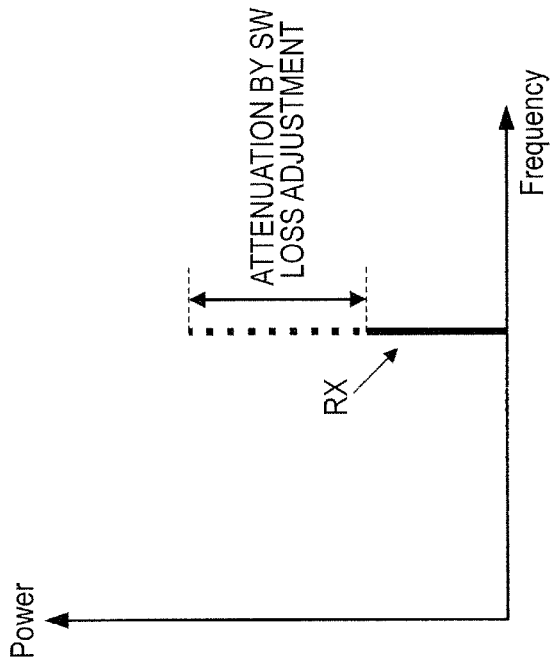
FIGS. 8A and 8B are graphs for explaining effectiveness of the antenna switch according to the first embodiment of the invention.

Further, as shown in FIG. 8A, in a general communication device, the reception power Rx of the high frequency signal is decreased by gain adjustment in the LNA. Consequently, the gain of the LNA is required to have a predetermined dynamic range, so that the scale and power consumption of the RFIC increases. To be concrete, LNAs have to be provided in multiple stages and controlled individually.

Figure 8B:
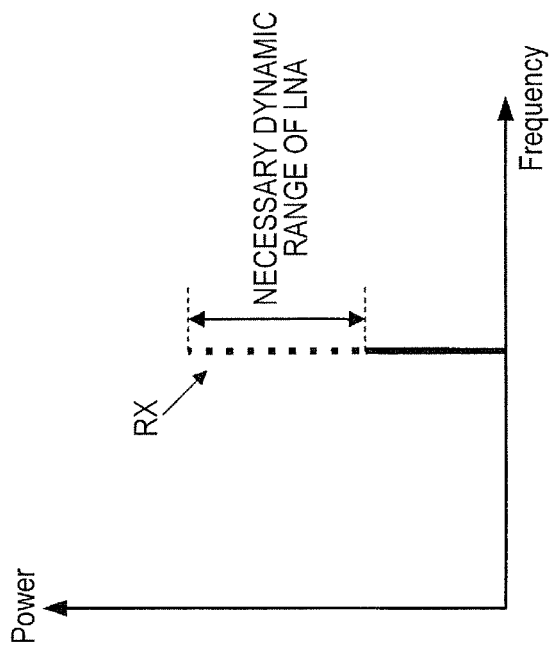

On the other hand, in the embodiment, as shown in FIG. 8B, by the SW loss adjustment in the antenna switch 10, the reception power RX is maintained at a predetermined level. Consequently, the gain adjustment by the LNA becomes unnecessary or the number of LNA stages and the number of controls accompanying the number of LNA stages are decreased. Therefore, design of the RFIC is facilitated, and the circuit scale and power consumption can be reduced.

It is generally known that the power loss in the proximity of the antenna exerts a large influence on the communication characteristics. In the antenna switch of the first embodiment, however, an FET series included in an existing antenna switch is also used as an element for varying a passage loss. In other words, the embodiment has an advantage such that an element which may cause a power loss does not have to be newly completely and additionally provided for the communication device. Therefore, the influence of the antenna switch of the embodiment exerted on the communication characteristics is much smaller than that of a technique of, for example, performing impedance adjustment between an antenna switch and an RFIC (in a place after the antenna switch and before the HPA or LNA).

Second Embodiment

A communication device of a second embodiment can be configured in a manner similar to that of the first embodiment. The second embodiment is different from the first embodiment with respect to the point that the antenna switch is configured as shown in FIG. 9.

Figure 9:
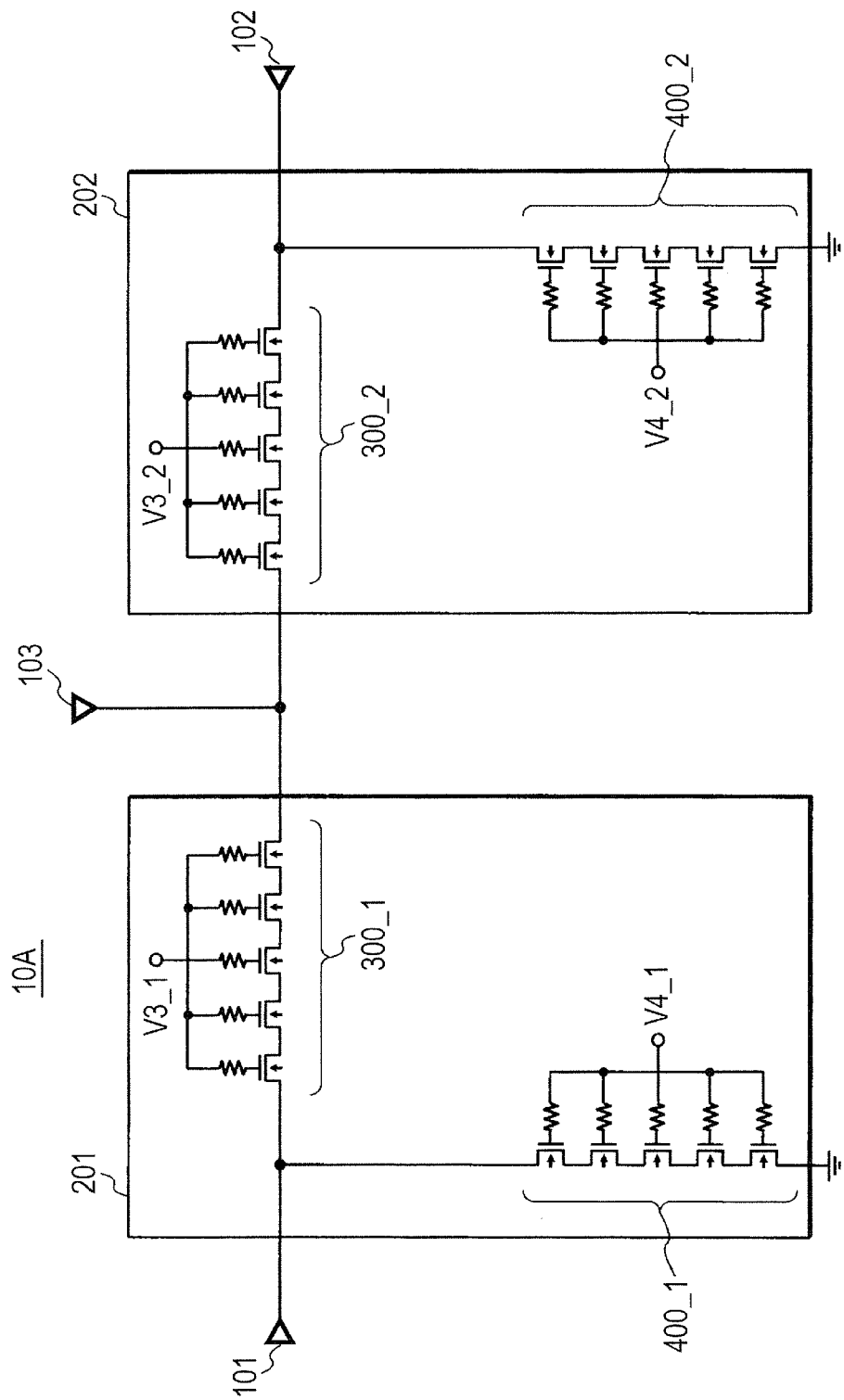
FIG. 9 is a block diagram showing a configuration example of an antenna switch according to a second embodiment of the present invention.

Concretely, as shown in FIG. 9, the first switch 201 in an antenna switch 10A of the second embodiment is provided with a first FET series block 300_1 in place of the series first FET block 301_1 shown in FIG. 3. The first FET series block 300_1 is configured by a plurality of FETs whose source and drain paths are coupled in series between the first signal terminal 101 and the antenna terminal 103. To the FETs in the first FET series block 300_1, common first series control voltage V3_1 is applied from the RFIC 50 or the BB circuit 40 via gate resistors.

The switch 202 is provided with a series block 300_2 in place of the series block 301_2 shown in FIG. 3. The second FET series block 300_2 is made by a plurality of FETs whose source and drain paths are coupled in series between the second signal terminal 102 and the antenna terminal 103. To the FETs in the second FET series block 300_2, common second series control voltage V3_2 is applied from the RFIC 50 or the BB circuit 40 via gate resistors.

Figure 10:
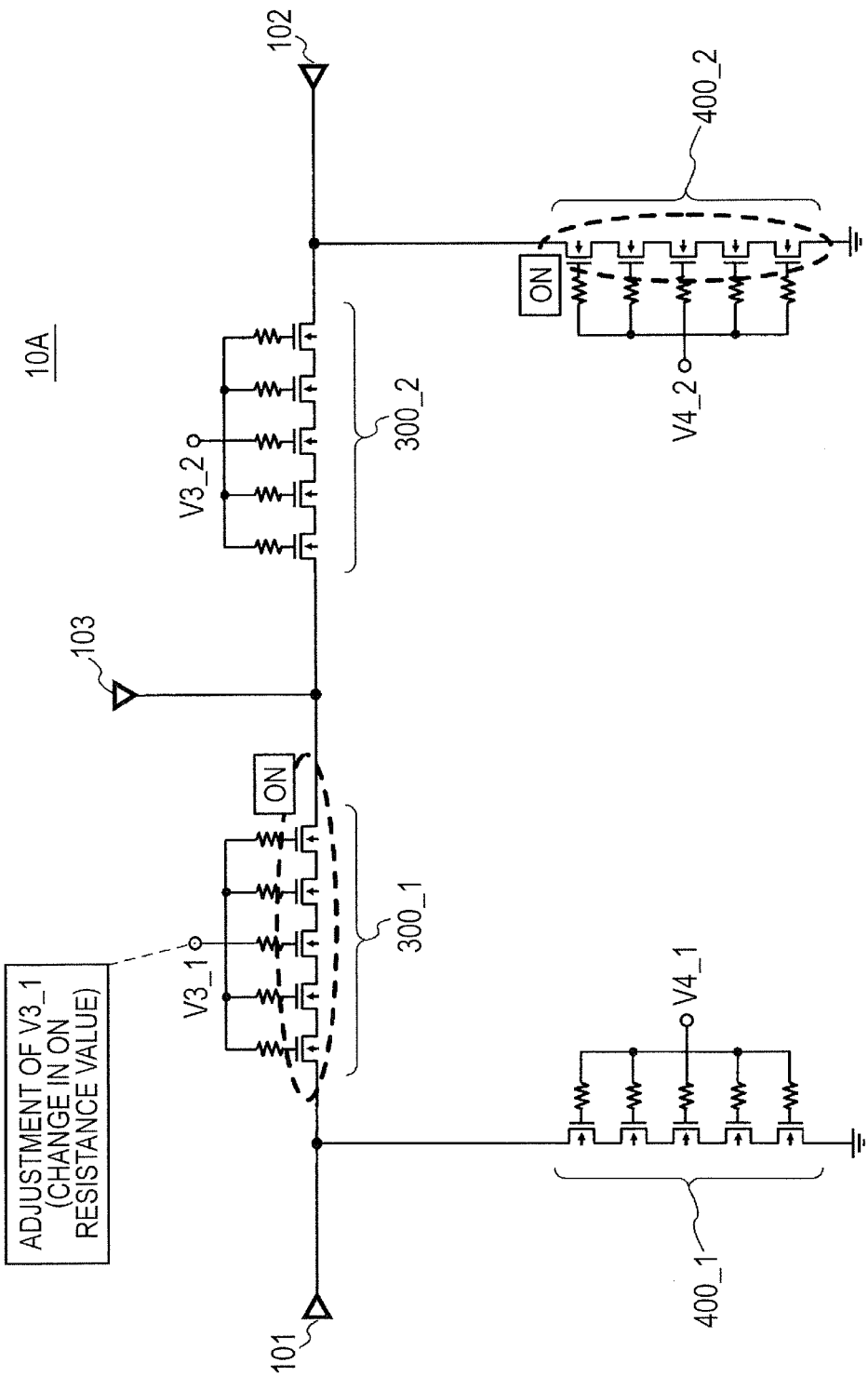
FIG. 10 is a block diagram showing an operation example of the antenna switch according to the second embodiment of the invention.

Next, operation related to the SW loss adjustment in the antenna switch 10A will be described using a case, as an example, where the first switch 201 is set to the propagation state and the second switch 202 is set to the interruption state as shown in FIG. 10.

The RFIC 50 or the BB circuit 40 turns on the FETs in the first FET series block 300_1.

At this time, the RFIC 50 or the BB circuit 40 adjusts the common first series control voltage V3_1 to change the on resistance value of the FETs in the first FET series block 300_1 to a higher value. Although not shown, the FETs in the first FET shunt block 400_1 and the FETs in the second FET series block 300_2 are off. In a manner similar to FIG. 4, the FETs in the second FET shunt block 400_2 are turned on to thereby suppress leak of the high frequency signal to the second signal terminal 102.

With a change in the on resistance value to a higher value (i.e., an increase in resistance), passage loss in each of the FETs in the first FET series block 300_1 increases as compared with that in the case where the FET is simply turns on. In other words, the passage loss in the entire first FET series block 300_1 increases. The first FET series block 300_1 may be configured so that the control voltage is applied individually to each of the FETs and the on resistance value of the FETs as a part can be changed. In this case as well, the passage loss in the entire first FET series block 300_1 increases. For example, using the first FET series block 301_1 shown in FIG. 3, both of an effect of increasing the passage loss by turning off a part of the FETs and an effect of increasing the passage by changing the resistance value of the remaining FETs which are turned on can be obtained.

Therefore, in a manner similar to the first embodiment, the high frequency signal can be attenuated between the signal terminal and the antenna terminal. In the embodiment, an effect such that the adjustment granularity of the attenuation amount can be made finer than that in the first embodiment is also obtained. For example, in a communication system employing WCDMA, power adjustment in fine steps is requested. The antenna switch 10A of the embodiment can flexibly address such a system request.

Third Embodiment

A communication device of a third embodiment can be configured in a manner similar to that of the first embodiment. The third embodiment is different from the first and second embodiments with respect to the point that the antenna switch is configured as shown in FIG. 11.

Figure 11:
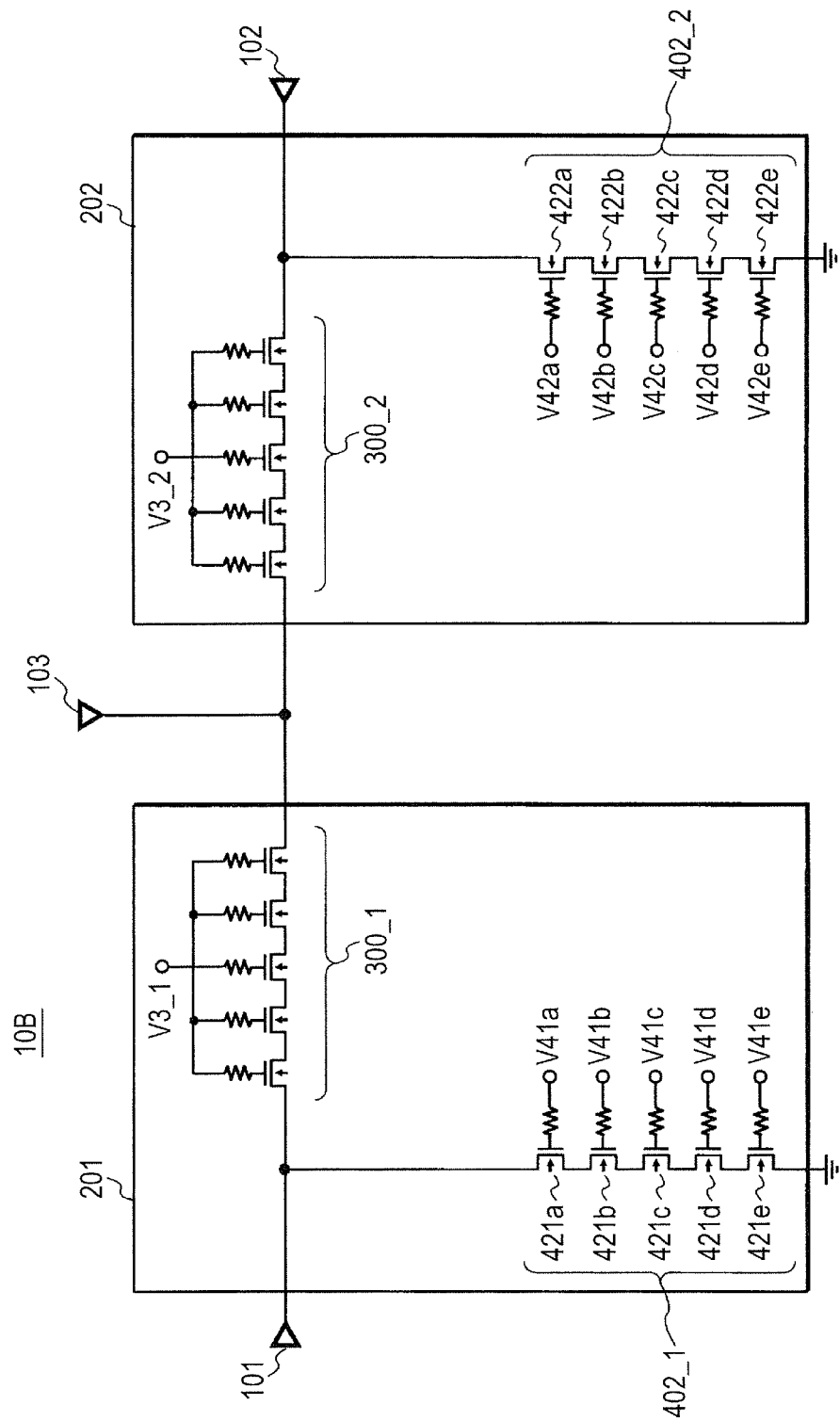
FIG. 11 is a block diagram showing a configuration example of an antenna switch according to a third embodiment of the invention.

Concretely, as shown in FIG. 11, the first switch 201 in an antenna switch 10B of the third embodiment includes the first FET series block 300_1 like in FIG. 9. The first switch 201 is provided with a first FET shunt block 402_1 in place of the first FET shunt block 400_1 shown in each of FIGS. 3 and 9. For example, the first FET shunt block 402_1 is made by five FETs 421a to 421e whose source and drain paths are coupled in series between the ground point and a coupling point (first node) between the signal terminal 101 and the first FET series block 300_1. To the FETs 421a, 421b, 421c, 421d, and 421e, individual control voltages V41a, V41b, V41c, V41d, and V41e are applied, respectively, from the RFIC 50 or the BB circuit 40 via gate resistors.

Like in FIG. 9, the switch 202 includes the second FET series block 300_2. The switch 202 is provided with a second FET shunt block 402_2 in place of the second FET shunt block 400_2 shown in each of FIGS. 3 and 9. The second FET shunt block 402_2 is made by, for example, five FETs 422a to 422e whose source and drain paths are coupled in series between the ground point and a coupling point (second node) between the second signal terminal 102 and the second FET series block 300_2. To the FETs 422a, 422b, 422c, 422d, and 422e, individual control voltages V42a, V42b, V42c, V42d, and V42e are applied from the RFIC 50 or the BB circuit 40 via gate resistors.

Figure 12:
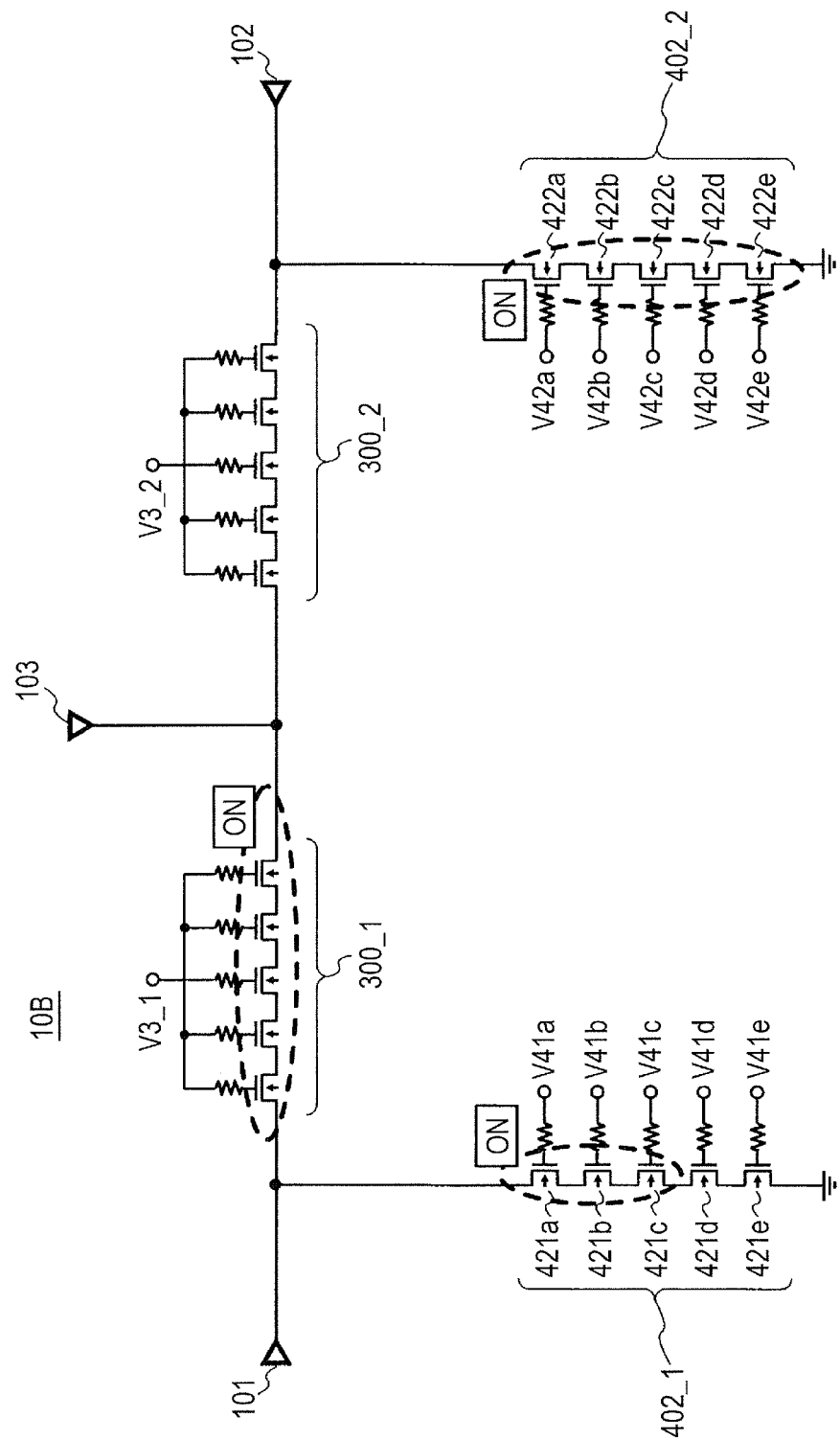
FIG. 12 is a block diagram showing an operation example of the antenna switch according to the third embodiment of the invention.

Next, operation related to the SW loss adjustment in the antenna switch 10B will be described using a case, as an example, where the first switch 201 is set to the propagation state and the second switch 202 is set to the interruption state as shown in FIG. 12.

The RFIC 50 or the BB circuit 40 turns on the FETs in the first FET series block 300_1. By the operation, the high frequency signal is propagated between the first signal terminal 101 and the antenna terminal 103. Although not shown, the FETs in the second FET series block 300_2 are off.

The RFIC 50 or the BB circuit 40 turns on at least a part of the FETs in the first FET shunt block 402_1 by applying individual control voltages which are equal to or higher than the threshold voltage of each corresponding FET. In the example of FIG. 12, the three FETs 421a to 421c are turned on, and the remaining two FETs 421d and 421e are turned off.

By the operation, the high frequency signal is shunted toward the ground point. As a result, the power of the high frequency signal output to the first signal terminal 101 and the antenna terminal 103 can be attenuated. The attenuation amount can be adjusted step by step by changing the number of FETs which are turned on.

Further, the RFIC 50 or the BB circuit 40 turns on the FETs in the second FET shunt block 402_2 to thereby suppress leak of the high frequency signal to the second signal terminal 102.

In such a manner, in the embodiment, in a manner similar to the first and second embodiments, the high frequency signal can be attenuated between the signal terminal and the antenna terminal. Since the size of the FET in a shunt block is generally smaller than that in the series block, in the embodiment, an effect that the adjustment granularity of the attenuation amount can be made finer than that in the first embodiment is also obtained. Therefore, the antenna switch 10B of the embodiment can flexibly address a system request in a manner similar to the second embodiment. Further, the antenna switch 10B also has an advantage that surge voltage such as ESD (Electrostatic Discharge) is allowed to escape to the ground point, and the transmission/reception circuit 20 is not easily destroyed.

Fourth Embodiment

A communication device of a fourth embodiment can be configured in a manner similar to that of the first embodiment. The fourth embodiment is different from the first to third embodiments with respect to the point that the antenna switch is configured as shown in FIG. 13.

Figure 13:
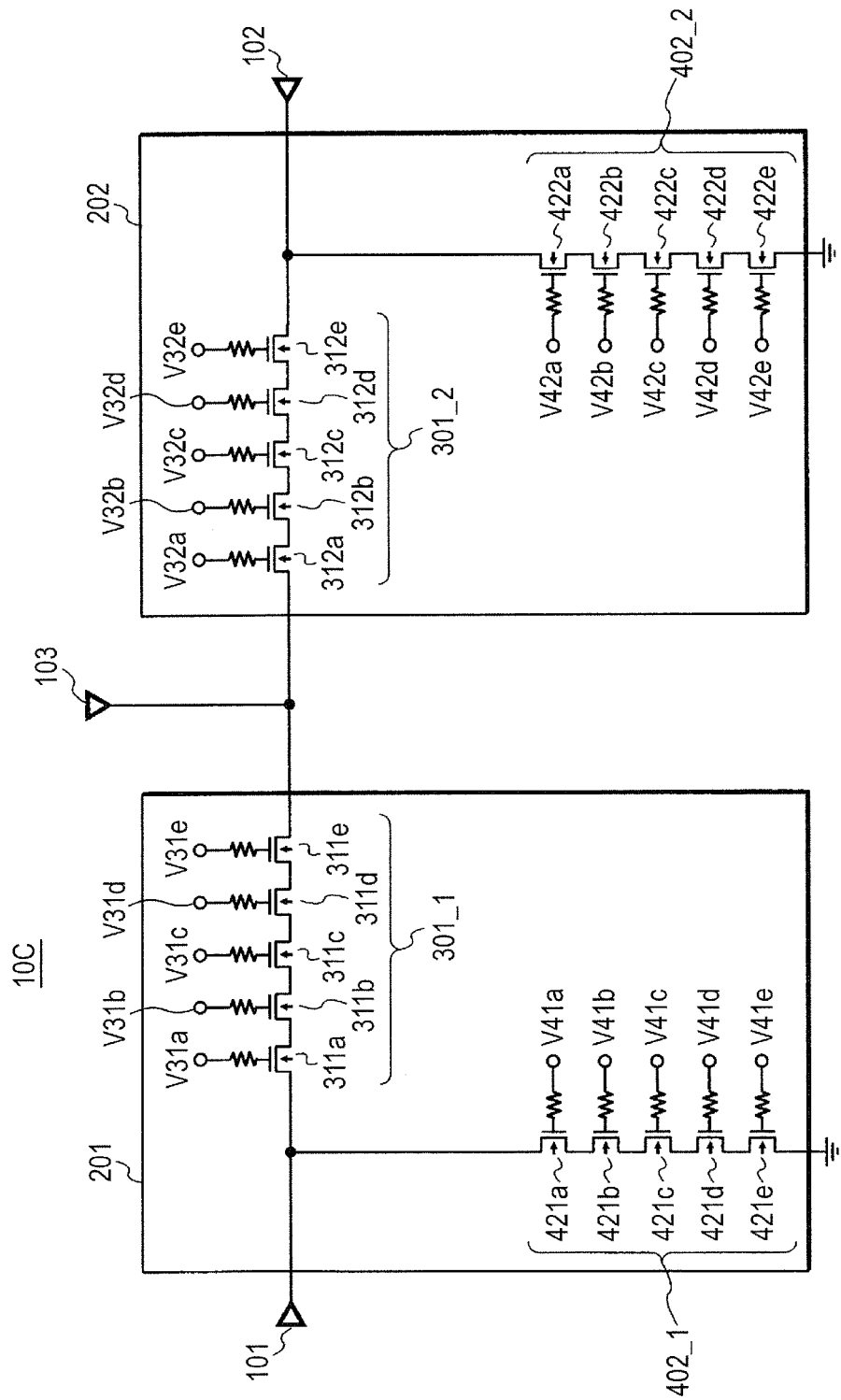
FIG. 13 is a block diagram showing a configuration example of an antenna switch according to a fourth embodiment of the present invention.

Concretely, as shown in FIG. 13, the first switch 201 in an antenna switch 10C of the fourth embodiment includes both the first FET series block 301_1 shown in FIG. 3 and the first FET shunt block 402_1 shown in FIG. 11. The second switch 202 includes both the second FET series block 301_2 shown in FIG. 3 and the second FET shunt block 402_2 shown in FIG. 11.

Figure 14:
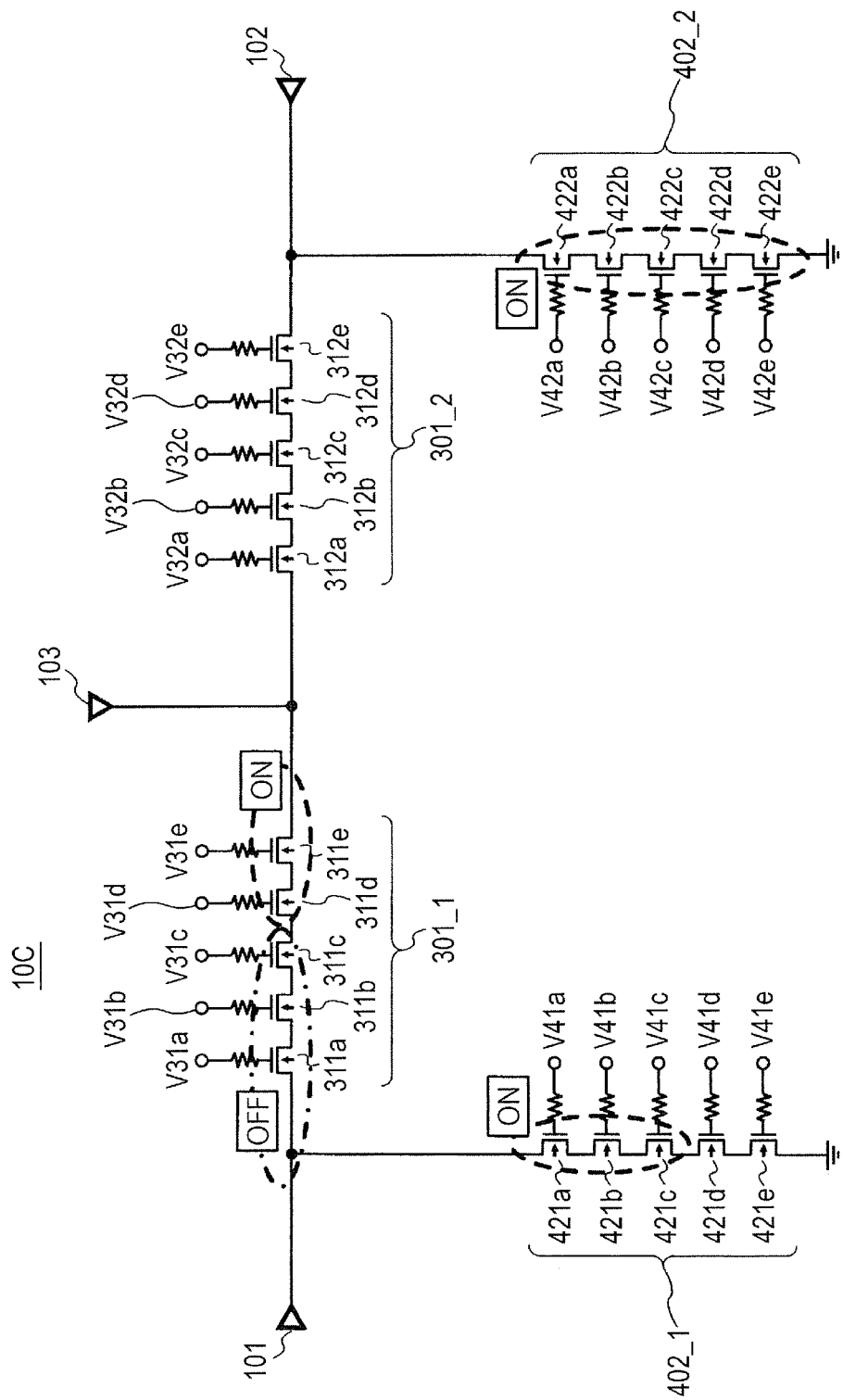
FIG. 14 is a block diagram showing an operation example of the antenna switch according to the fourth embodiment of the invention.

Next, operation related to the SW loss adjustment in the antenna switch 10C will be described using a case, as an example, where the first switch 201 is set to the propagation state and the second switch 202 is set to the interruption state as shown in FIG. 14.

Figure 4:
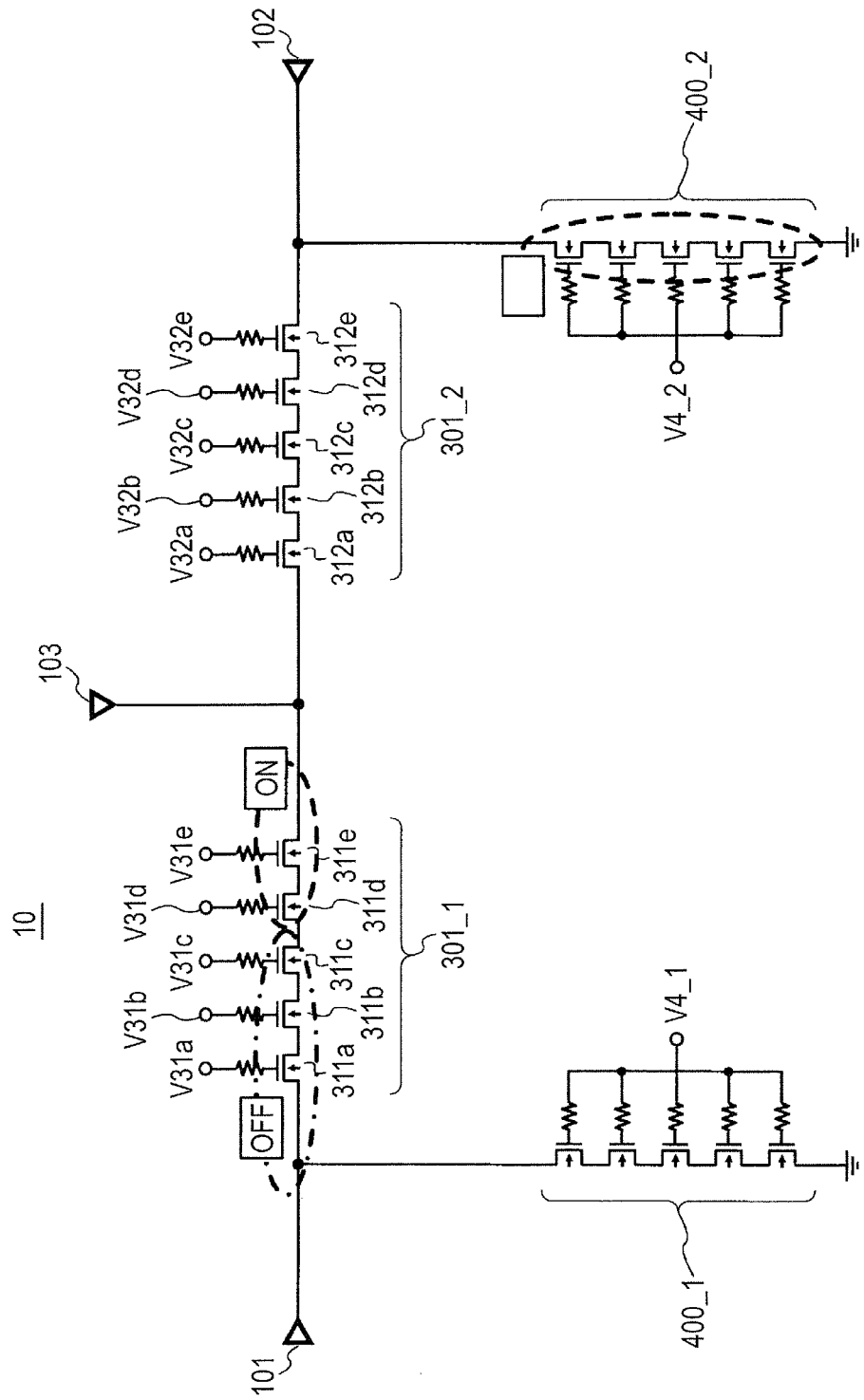
FIG. 4 is a block diagram showing an operation example of the antenna switch according to the first embodiment of the invention.

In this case, in a manner similar to FIG. 4, a first number of FETs 311a to 311c in the first FET series block 301_1 are turned off and the remaining number (two) of FETs 311d and 311e are turned on. Therefore, the passage loss in the first FET series block 301_1 becomes larger as compared with the case where all of the FETs are turned on.

In a manner similar to FIG. 12, a second number of FETs 421a to 421c in the first FET shunt block 402_1 are turned on so that the high frequency signal is shunted toward the ground point. As a result, the power of the high frequency signal which is output to the first signal terminal 101 and the antenna terminal 103 is attenuated. Further, the FETs in the second FET shunt block 402_2 are turned on so that leak of the high frequency signal to the signal terminal 102 is suppressed.

In such a manner, in the embodiment, the attenuation amount of the high frequency signal can be adjusted step by step and at finer granularity. Therefore, the fourth embodiment can obtain both the effect described in the first embodiment and the effect described in the third embodiment.

Fifth Embodiment

A communication device of a fifth embodiment can be configured in a manner similar to that of the first embodiment. The fifth embodiment is different from the first to fourth embodiments with respect to the point that the antenna switch is configured as shown in FIG. 15.

Figure 15:
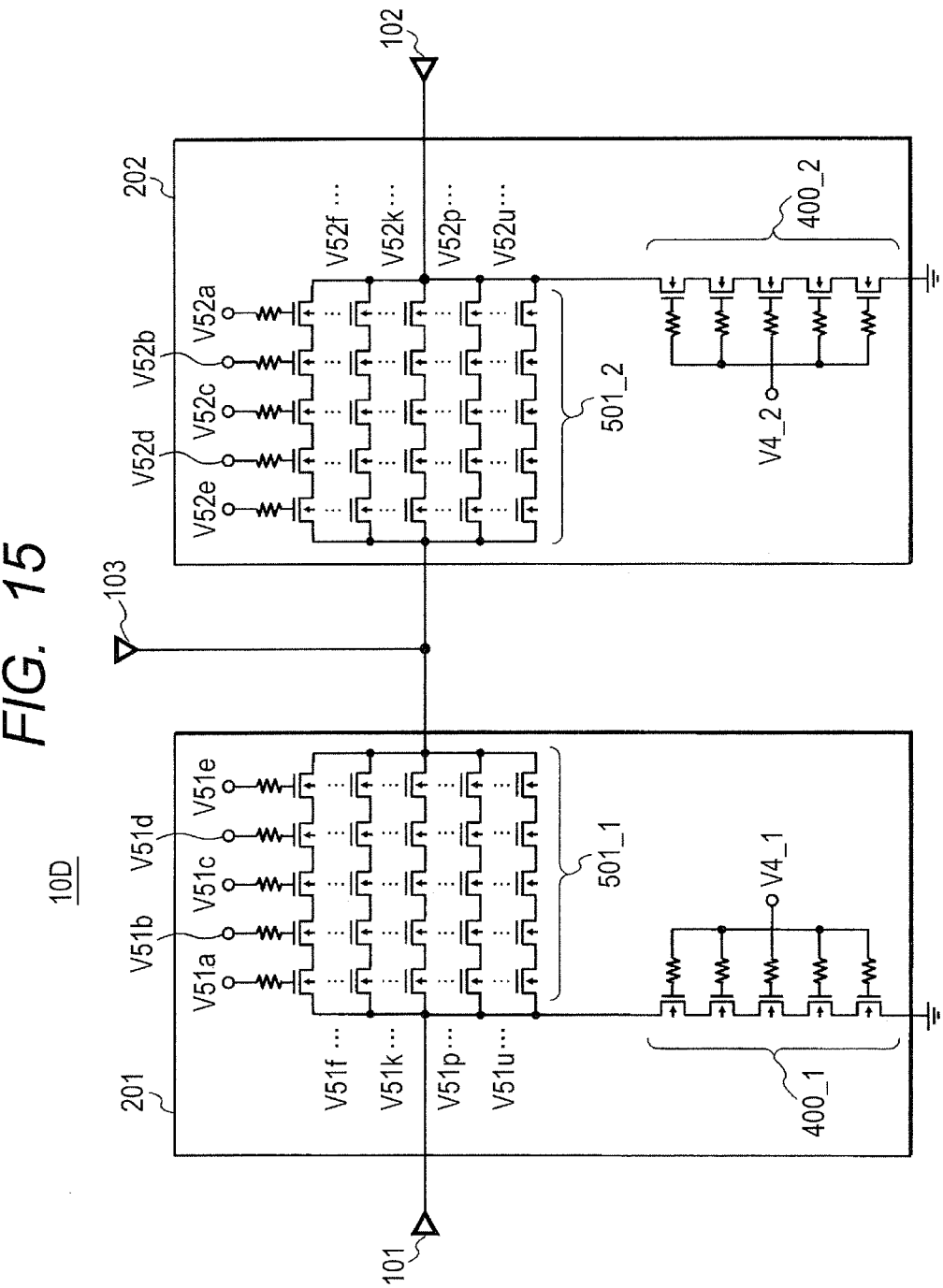
FIG. 15 is a block diagram showing a configuration example of an antenna switch according to a fifth embodiment of the invention.

Concretely, as shown in FIG. 15, the first switch 201 in an antenna switch 10D of the fifth embodiment is provided with a first FET parallel network 501_1 in place of the first FET series block 301_1 shown in FIG. 3. In the first FET parallel network 501_1, as an example, a first plurality (five, in the shown embodiment) FET series blocks are coupled in parallel, each FET series block including a second plurality (five, in this embodiment) FETs whose source and drain paths are coupled in series between the first signal terminal 101 and the antenna terminal 103. To the FETs in the first FET parallel network 501_1, individual control voltages V51$a$ to V51$e$, V51$f$..., V51$k$..., V51$p$..., and V51$u$... are applied from the RFIC 50 or the BB circuit 40 via gate resistors.

The second switch 202 is provided with a second FET parallel network 501_2 in place of the second FET series block 301_2 shown in FIG. 3. In the second FET parallel network 501_2, as an example, a third plurality (five, in the shown embodiment) FET series blocks are coupled in parallel, each FET series block including a fourth plurality (five, in this embodiment) FETs whose source and drain paths are coupled in series between the second signal terminal 102 and the antenna terminal 103. To the FETs in the second FET parallel network 501_2, individual control voltages V52$a$ to V52$e$, V52$f$..., V52$k$..., V52$p$..., and V52$u$... are applied from the RFIC 50 or the BB circuit 40 via gate resistors.

Figure 16:
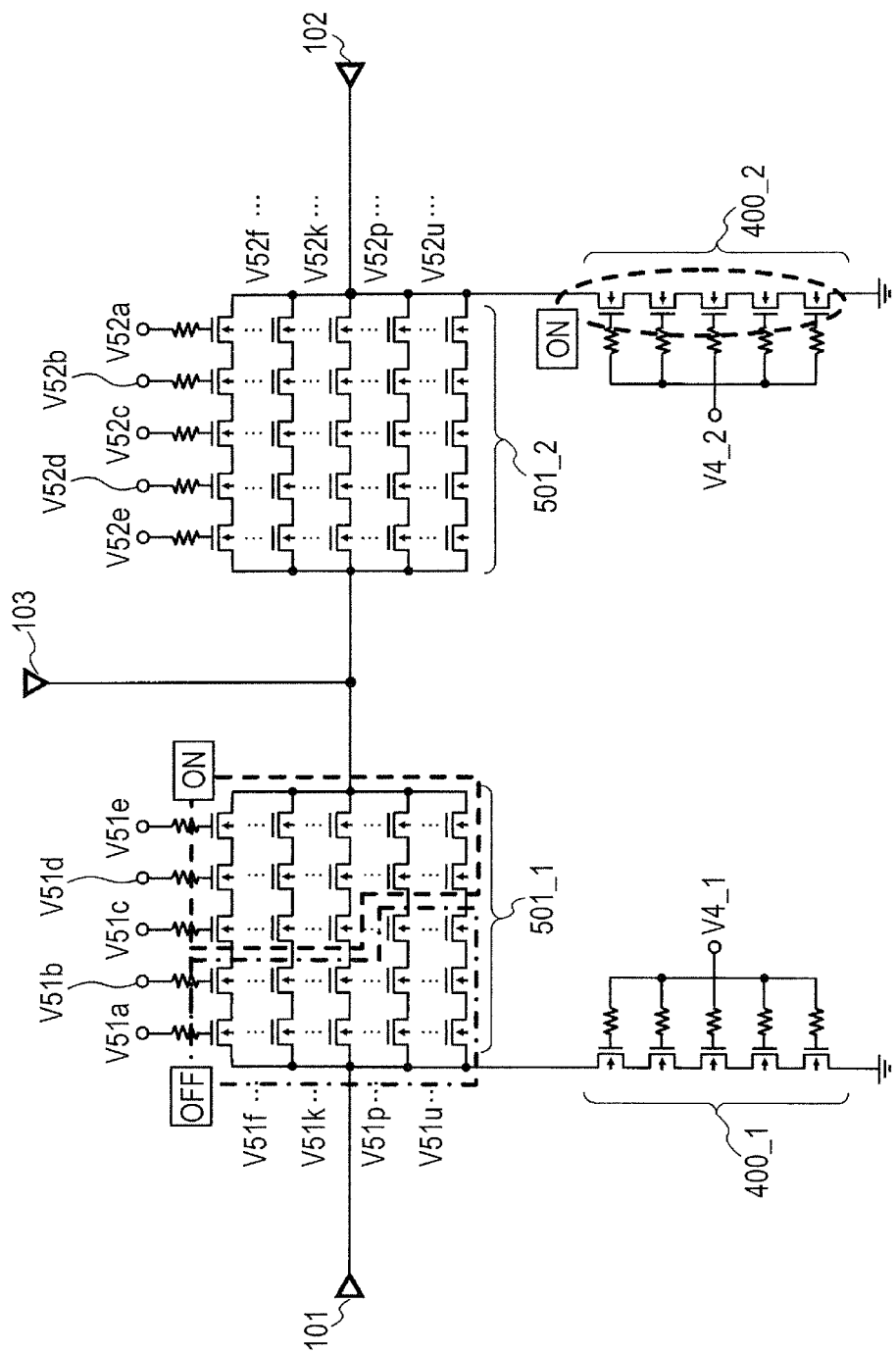
FIG. 16 is a block diagram showing an operation example of the antenna switch according to the fifth embodiment of the invention.

Next, operation related to the SW loss adjustment in the antenna switch 10D will be described using a case, as an example, where the first switch 201 is set to the propagation state and the second switch 202 is set to the interruption state as shown in FIG. 16.

The RFIC 50 or the BB circuit 40 turns off a first number of FETs in the first FET parallel network 501_1. On the other hand, the RFIC 50 or the BB circuit 40 turns on the remaining second number of FETs in the first FET parallel network 501_1. In the example of FIG. 16, of a total of 25 FETs (5 parallelly arranged FET series blocks×5 FETs per FET series block), 12 FETs are turned off and the remaining 13 FETs are turned on. Although not illustrated, the FETs in the first FET shunt block 400_1 and the FETs 312$a$ to 312$e$ in the second FET parallel network 501_2 are off. Consequently, the FETs in the second FET shunt block 400_2 are turned on, so that leak of the high frequency signal to the second signal terminal 102 is suppressed.

In the embodiment, therefore, the attenuation amount of the high frequency signal can be adjusted step by step in a manner similar to the first embodiment. In addition, in the embodiment, the width of a step of varying the attenuation amount can be set finer than that in the first embodiment. The granularity of the varying step width is proportional to the number of FET series coupled in parallel.

Obviously, the present invention is not limited to the foregoing embodiments but can be variously changed by a person skilled in the art on the basis of the description of the scope of claims for patent.

What is claimed is:

1. An attenuating antenna switch having at least two mutually exclusive attenuating signal paths therethrough, comprising:
   a first terminal, a second terminal and an antenna terminal;
   a first switch connected between the first terminal and the antenna terminal;
   a second switch connected between the second terminal and the antenna terminal;
   wherein:
   in response to first control signals:
      the first switch is configured to attenuate a first signal passing between the first terminal and the antenna terminal by a first attenuation amount, and
      the second switch is configured to suppress said first signal from leaking between the antenna terminal and the second terminal; and
   in response to second control signals:
      the second switch is configured to attenuate a second signal passing between the second terminal and the antenna terminal by a second attenuation amount, and
      the first switch is configured to suppress said second signal from leaking between the antenna terminal and the first terminal.

2. The attenuating antenna switch according to claim 1, wherein:
   the first switch comprises a first FET series block including a first plurality of FETs (Field Effect Transistors) coupled in series between the first terminal and the antenna terminal, and a first FET shunt block including a second plurality of FETs coupled in series between the first terminal and a ground point, and
   the second switch comprises a second FET series block including a third plurality of FETs (Field Effect Transistors) coupled in series between the second terminal and the antenna terminal, and a second FET shunt block including a fourth plurality of FETs coupled in series between the second terminal and the ground point.

3. The attenuating antenna switch according to claim 2, wherein:
   gates of the FETs in the first FET series block are configured to be controlled by individual first series control voltages;
   gates of the FETs in the first FET shunt block are configured to be controlled by a common first shunt control voltage;
   gates of the FETs in the second FET series block are configured to be controlled by individual second series control voltages;
   gates of the FETs in the second FET shunt block are configured to be controlled by a common second shunt control voltage.

4. The attenuating antenna switch according to claim 2, wherein:
   gates of the FETs in the first FET series block are configured to be controlled by a common first series control voltage;
   gates of the FETs in the first FET shunt block are configured to be controlled by a common first shunt control voltage;
   gates of the FETs in the second FET series block are configured to be controlled by a common second series control voltage; and
   gates of the FETs in the second FET shunt block are configured to be controlled by a common second shunt control voltage.

5. The attenuating antenna switch according to claim 2, wherein:
   gates of the FETs in the first FET series block are configured to be controlled by a common first series control voltage;

gates of the FETs in the first FET shunt block are configured to be controlled by individual first shunt control voltages;
gates of the FETs in the second FET series block are configured to be controlled by a common second series control voltage;
gates of the FETs in the second FET shunt block are configured to be controlled by individual second shunt control voltages.

6. The attenuating antenna switch according to claim 2, wherein:
gates of the FETs in the first FET series block are configured to be controlled by individual first series control voltages;
gates of the FETs in the first FET shunt block are configured to be controlled by individual first shunt control voltages;
gates of the FETs in the second FET series block are configured to be controlled by individual second series control voltages;
gates of the FETs in the second FET shunt block are configured to be controlled by individual second shunt control voltages.

7. The attenuating antenna switch according to claim 2, wherein:
in response to the first control signals, a first number of FETs in the first FET series block are off and a second number of FETs in the first FET series block are on; and
the first attenuation amount is determined, at least in part, by the number of FETs that are off.

8. The attenuating antenna switch according to claim 7, wherein:
the first control signals apply different voltages to each of the gates of the FETs in the first FET series block that are on, and
the first attenuation amount is further determined, at least in part, by values of said different voltages.

9. The attenuating antenna switch according to claim 7, wherein:
in response to the first control signals, a third number of FETs in the first FET shunt block are off and a fourth number of FETs in the first FET shunt block are on.

10. The attenuating antenna switch according to claim 2, wherein:
in response to the first control signals, all the FETs in the first FET series block are on.

11. The attenuating antenna switch according to claim 10, wherein:
the first control signals apply a common first series control voltage to gates of all the FETs in the first FET series block; and
the first attenuation amount is determined, at least in part, by a value of said common first series control voltage.

12. The attenuating antenna switch according to claim 10, wherein:
in response to the first control signals, a third number of FETs in the first FET shunt block are off and a fourth number of FETs in the first FET shunt block are on.

13. The attenuating antenna switch according to claim 12, wherein:
the first control signals apply a common first series control voltage to gates of all the FETs in the first FET series block; and
the first attenuation amount is determined, at least in part, by a value of said common first series control voltage.

14. The attenuating antenna switch according to claim 1, wherein the first switch comprises:

a first FET parallel network comprising, in parallel, a plurality of FET series blocks, each FET series block including a first plurality of FETs coupled in series between the first terminal and the antenna terminal, and
a first FET shunt block including a second plurality of FETs coupled in series between the first terminal and a ground point; and
wherein the second switch comprises:
a second FET parallel network comprising, in parallel, a plurality of FET series blocks, each FET series block including a first plurality of FETs coupled in series between the first second and the antenna terminal, and
a second FET shunt block including a second plurality of FETs coupled in series between the second terminal and the ground point.

15. The attenuating antenna switch according to claim 14, wherein:
in response to said first control signals, a first number of FETs in the first FET parallel network are on and a second number of FETs in the first FET parallel network are off, thereby determining, at least in part, the first attenuation amount; and
in response to said second control signals, a third number of FETs in the second FET parallel network are on and a fourth number of FETs in the second FET parallel network are off, thereby determining, at least in part, the second attenuation amount.

16. A cellular phone comprising:
the attenuating antenna switch according to claim 1;
an antenna connected to the antenna terminal of the antenna switch; and
a transmission/reception circuit having a first circuit terminal connected to the first terminal of the antenna switch and a second circuit terminal connected to the second signal of the antenna switch, the transmission/reception circuit configured to provide said control signals to the antenna switch in response to at least one predetermined condition.

17. The cellular phone according to claim 16, wherein:
the transmission/reception circuit is configured to provide said control signals to the antenna switch in response to a measurement of received signal strength to adjust at least one of the first attenuation amount and the second attenuation amount so as to control a power level of a signal received from or sent to the antenna switch so that said power level is within a dynamic range of transmission/reception circuit.

18. The cellular phone according to claim 17, wherein:
the transmission/reception circuit comprises a radio frequency integrated circuit (RFIC) and a baseband circuit;
the RFIC is configured to provide the control signals to the antenna switch so that said power level is within a dynamic range of the RFIC.

19. The cellular phone according to claim 17, wherein:
the cellular phone is configured to selectively operate in more than one frequency band; and
the transmission/reception circuit is configured to provide said control signals to the antenna switch in accordance with a frequency band in which the cellular phone is operating.

20. The cellular phone according to claim 17, wherein:
the cellular phone is configured to operate according to a time division duplex method having transmission periods and reception periods; and the transmission/reception circuit is configured to provide the first control signals for transmission periods and provide the second control signals for reception periods.

* * * * *